United States Patent
Shibata

(10) Patent No.: US 10,721,468 B2
(45) Date of Patent: Jul. 21, 2020

(54) INTRA-PREDICTION MODE DETERMINATION METHOD, INTRA-PREDICTION MODE DETERMINATION DEVICE, AND STORAGE MEDIUM FOR STORING INTRA-PREDICTION MODE DETERMINATION PROGRAM

(71) Applicant: NEC Corporation, Minato-ku, Tokyo (JP)

(72) Inventor: Seiya Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/332,022

(22) PCT Filed: Sep. 8, 2017

(86) PCT No.: PCT/JP2017/032526
§ 371 (c)(1),
(2) Date: Mar. 11, 2019

(87) PCT Pub. No.: WO2018/047952
PCT Pub. Date: Mar. 15, 2018

(65) Prior Publication Data
US 2019/0364271 A1    Nov. 28, 2019

(30) Foreign Application Priority Data

Sep. 12, 2016  (JP) .................................. 2016-177303

(51) Int. Cl.
*H04N 19/11* (2014.01)
*H04N 19/147* (2014.01)
*H04N 19/176* (2014.01)

(52) U.S. Cl.
CPC ........... *H04N 19/11* (2014.11); *H04N 19/147* (2014.11); *H04N 19/176* (2014.11)

(58) Field of Classification Search
None
See application file for complete search history.

(56) References Cited

U.S. PATENT DOCUMENTS 9,148,667 B2 *  9/2015  Chien ................... H04N 19/105
9,491,466 B2 * 11/2016  Lei ....................... H04N 19/147
(Continued)

FOREIGN PATENT DOCUMENTS

JP    2007266679 A    10/2007
JP    2014187535 A    10/2014
(Continued)

OTHER PUBLICATIONS

International Search Report, dated Nov. 28, 2017 from the International Bureau in counterpart International application No. PCT/JP2017/032526.
(Continued)

*Primary Examiner* — Reza Aghevli

(57) ABSTRACT

An intra-prediction mode determination device is applied in a video coding device that recursively divides input video blocks into small blocks to perform coding by intra-prediction or inter-frame prediction, and includes a prediction mode selection unit and a number of bins adjustment unit that are provided in correspondence to only one of possible sizes of the small blocks. The prediction mode selection unit evaluates, with respect to each of the small blocks, the coding cost of a plurality of prediction mode candidates on the basis of a residual corresponding to the prediction mode candidates and the number of bins allocated to the prediction mode candidates, and selects an intra-prediction mode from the plurality of prediction mode candidates. The number of bins adjustment unit, when the prediction mode selection unit evaluates the coding cost, increases the number of bins corresponding to a specific prediction mode candidate.

15 Claims, 14 Drawing Sheets

(56) References Cited

U.S. PATENT DOCUMENTS

| | | | |
|---|---|---|---|
| 9,973,753 B2* | 5/2018 | Moriya | H04N 19/107 |
| 10,009,615 B2* | 6/2018 | Gisquet | H04N 19/52 |
| 10,390,011 B2* | 8/2019 | Moriya | H04N 19/176 |
| 10,412,385 B2* | 9/2019 | Moriya | H04N 19/107 |
| 10,469,839 B2* | 11/2019 | Moriya | H04N 19/109 |
| 2013/0028326 A1* | 1/2013 | Moriya | H04N 19/13 |
| | | | 375/240.16 |
| 2014/0219349 A1* | 8/2014 | Chien | H04N 19/105 |
| | | | 375/240.13 |
| 2015/0264346 A1* | 9/2015 | Yamashita | H04N 19/103 |
| | | | 375/240.02 |
| 2016/0100186 A1* | 4/2016 | Gisquet | H04N 19/52 |
| | | | 382/238 |
| 2017/0171543 A1* | 6/2017 | Moriya | H04N 19/13 |
| 2017/0264904 A1* | 9/2017 | Koval | H04N 19/176 |
| 2019/0306497 A1* | 10/2019 | Moriya | H04N 19/46 |

FOREIGN PATENT DOCUMENTS

| | | |
|---|---|---|
| JP | 2015177466 A | 10/2015 |
| JP | 2015181225 A | 10/2015 |
| WO | 2011033853 A1 | 3/2011 |
| WO | 2012105406 A1 | 8/2012 |
| WO | 2013125171 A1 | 8/2013 |
| WO | WO-2013125171 A1 * | 8/2013 ........... H04N 19/198 |
| WO | 2016116984 A1 | 7/2016 |

OTHER PUBLICATIONS

Written Opinion, dated Nov. 28, 2017 from the International Bureau in counterpart International application No. PCT/JP2017/032526.
ITU-T-Telecommunication Standardization Sector of ITU; H.265; Series H: Audiovisual and Multimedia Systems: Infrastructure of audiovisual services—Coding of moving video; 2015, pp. 1-610 (634 pages).

* cited by examiner

Fig.11
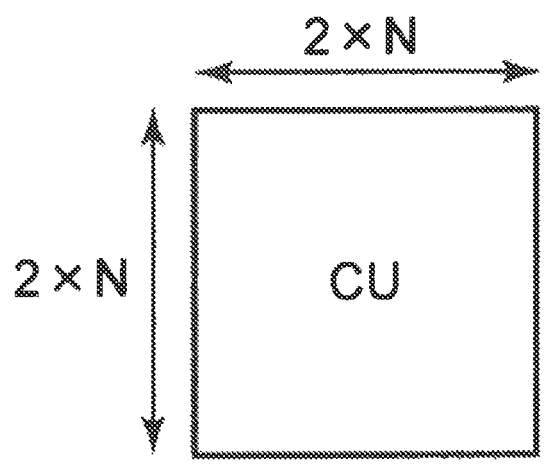
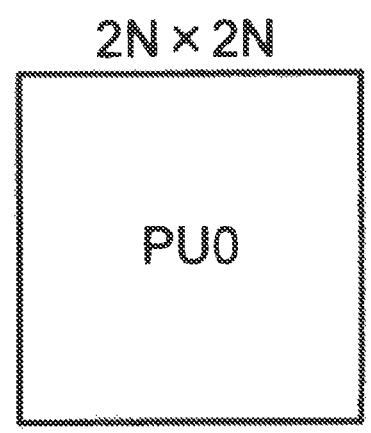 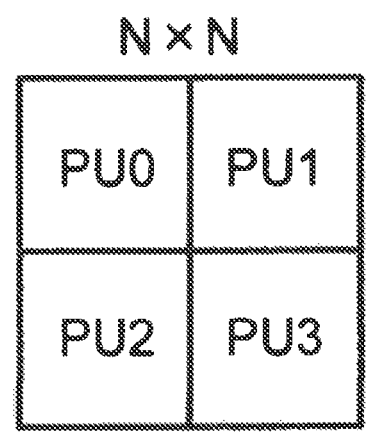

INTRA-PREDICTION MODE DETERMINATION METHOD, INTRA-PREDICTION MODE DETERMINATION DEVICE, AND STORAGE MEDIUM FOR STORING INTRA-PREDICTION MODE DETERMINATION PROGRAM

This application is a National Stage Entry of PCT/JP2017/032526 filed on Sep. 8, 2017, which claims priority from Japanese Patent Application 2016-177303 filed on Sep. 12, 2016, the contents of all of which are incorporated herein by reference, in their entirety.

TECHNICAL FIELD

The present invention relates to an intra-prediction mode determination method, an intra-prediction mode determination device, and an intra-prediction mode determination program being applied to a video encoding device.

BACKGROUND ART

NPL 1 describes High Efficiency Video Coding (HEVC) that is a video coding method based on ITU-T recommendation H.265 standard.

In HEVC, frames of a digitized video are divided into coding tree units (CTUs) and the CTUs are encoded in raster scanning order. Each CTU has a quadtree structure and is encoded by being recursively divided into coding units (CUs). Each CU is predicted by being divided into prediction units (PUs). A prediction error (residual) of each CU is divided into transform units (TUs) in a quadtree structure and the divided transform units are subjected to frequency conversion.

FIG. 10A and FIG. 10B each are an illustrative diagram illustrating a quadtree structure corresponding to an CU division example of a CTU. In the example illustrated in FIG. 10A, a quadtree structure of a CTU can be expressed, as illustrated in a hierarchical structure illustrated in FIG. 10B, by cu_split_flag=1 of a CUDepth=0 indicating that a block of 64×64 is divided, cu_split_flag=0 of three CUDepth=1 s indicating that first three CUs (CU0, CU1, and CU2) of 32×32 are not divided, cu_split_flag=1 of a CUDepth=1 indicating that a last CU of 32×32 is divided, cu_split_flag=0 of three CUDepth=2 s indicating that first three CUs (CU3, CU4, and CU5) of 16×16 are not divided, cu_split_flag=1 of a CUDepth=2 indicating that a last CU of 16×16 is divided, and cu_split_flag=0 of four CUDepth=3 s indicating that all CUs (CU6, CU7, CU8, and CU9) of 8×8 are not divided.

FIG. 11 is an illustrative diagram illustrating a PU division shape of a CU. In the case of intra-prediction, PU division (2N×2N or N×N) of a square can be selected (however, when a CU is larger than the minimum size, only 2N×2N can be selected).

A CU is encoded by predictive coding of intra-prediction or inter-frame prediction for each PU. Hereinafter, intra-prediction is described.

Intra-prediction is prediction for generating a prediction image from a reference pixel in an encoding target frame. In NPL 1, 33 types of angle intra-prediction illustrated in FIG. 12 are defined. Angle intra-prediction extrapolates reference pixels located in the periphery of an encoding target block to any one of 33 types of directions illustrated in FIG. 12 and generates an intra-prediction signal (prediction pixel). In NPL 1, in addition to 33 types of angle intra-prediction, DC prediction for averaging the reference pixels located in the periphery of an encoding target block and planar prediction for linearly interpolating reference pixels located in the periphery of an encoding target block are defined.

In FIG. 12, each rectangle of an upper most row and each rectangle of a leftmost column indicate a reference pixel. A number in a rectangle indicates a coordinate. An arrow indicates a prediction direction. A number assigned to a vicinity of an arrow indicates a prediction mode.

With reference to FIG. 13, a configuration and an operation of a general video encoding device that outputs a bitstream in which each CTU of each frame of a digitized video is an input image are described.

FIG. 13 is a block diagram illustrating one example of a general video encoding device. The video encoding device illustrated in FIG. 13 includes a transform unit 301, a quantization unit 302, an entropy encoding unit 303, an inverse-quantization/inverse-transform unit 304, a buffer 305, a prediction unit 306, and a prediction mode/block size determination unit 307.

The prediction mode/block size determination unit 307 determines a combination of a prediction mode and a block size for minimizing an encoding cost for each CTU. The prediction mode/block size determination unit 307 determines a TU quadtree structure, in addition to a CU quadtree structure/a PU division shape.

The prediction unit 306 generates a prediction signal for an input image signal of a CU, based on a prediction mode and a block size determined by the prediction mode/block size determination unit 307. A prediction signal is generated based on intra-prediction or inter-prediction.

The transform unit 301 frequency-transforms a residual image (a residual signal: a prediction error signal) acquired by subtracting a prediction signal from an input image signal, based on a TU quadtree structure determined by the prediction mode/block size determination unit 307. The transform unit 301 uses orthogonal transform of a 4×4, 8×8, 16×16, or 32×32 block size based on frequency transform in transform encoding of a residual signal. An n×n block size indicates a size of vertical n pixels and horizontal n pixels.

The quantization unit 302 quantizes an orthogonal transform coefficient supplied from the transform unit 301. Hereinafter, a quantized orthogonal transform coefficient may be referred to as a transform quantization value. The inverse-quantization/inverse-transform unit 304 inversely quantizes a transform quantization value. The inverse-quantization/inverse-transform unit 304 inversely transforms an inversely-quantized orthogonal transform coefficient. An inversely-transformed residual image is added with a prediction signal (predication image) and stored on the buffer 305. The buffer 305 stores an image as a reference image.

The prediction mode/block size determination unit 307 may be configured to predict, when determining a prediction mode and a PU division shape, for example, combinations of all usable prediction modes and all block sizes (in the case of intra-prediction, 4×4, 8×8, 16×16, 32×32, and 64×64), calculate a residual, and then determine an optimum combination, based on a prediction result and the like (see, for example, paragraphs 0052 to 0054 of PTL 1). An optimum combination is, for example, a combination that minimizes an encoding cost. A video encoding device including the prediction mode/block size determination unit 307 that evaluates combinations of all prediction modes and all block sizes is hereinafter referred to as a first video encoding device. PTL 2 describes an image processing device that evaluates all usable prediction modes and determines an optimum prediction mode (see, for example, paragraph 0329).

There is also a method of previously, i.e., before determining a prediction mode, determining a block size, based on an encoding cost and the like, and determining a prediction mode by using the determined block size. A video encoding device based on such a method is hereinafter referred to as a second video encoding device.

In encoding that allows a large block size as in HEVC, in an area similar in a feature of a video signal, a large PU size (a block size of a PU) and a large TU size (a block size of a TU) are applied, and thereby encoding efficiency is improved. Specifically, a bit volume (the number of bins i.e. a count of bins, referred to as a bin number) of data after encoding decreases.

There is a video encoding device including a function of expanding a block when a predetermined condition is satisfied in order to increase a block size as large as possible (see, for example, PTL 3). Expansion of a block indicates that a plurality of blocks are integrated into one block. A video encoding device including such a function is hereinafter referred to as a third video encoding device.

FIG. 14 is a block diagram illustrating a configuration of a third video encoding device described in PTL 3. The video encoding device illustrated in FIG. 14 includes an encoding parameter determination unit 110 that generates and outputs an encoding parameter by using an input video as input, an encoding unit 120, and a block expansion unit 370. The encoding unit 120 includes a configuration equal to a configuration in which the prediction mode/block size determination unit 307 is excluded from the video encoding device illustrated in FIG. 13.

When encoding of an input image starts, the encoding parameter determination unit 110 executes block division, searches an encoding mode (intra-prediction, inter-prediction, a skip mode, or the like) for each divided block and a prediction mode, and determines an encoding parameter #1. The encoding parameter determination unit 110 calculates an encoding cost and determines an encoding parameter, based on the encoding cost. An encoding cost is reflected with a value (the bin number) concerning an encode volume and encoding distortion (correlated with image quality). The encoding parameter determination unit 110 uses the following rate distortion (RD) cost as one example.

$$\text{cost} = D + \lambda \cdot R \quad (1)$$

In equation (1), D is encoding distortion, R is an encode volume considering also a transform coefficient, and λ is a Lagrange multiplier.

The block expansion unit 370 receives an encoding parameter #1, modifies a block size and motion vector information in the encoding parameter, and outputs the modified encoding parameter. The output encoding parameter is input to the encoding unit 120.

The block expansion unit 370 expands a block when, for example, all four blocks adjacent to each other have the same size and previously determined m (m: an integer) or more blocks are intra-prediction blocks among these four blocks. In other words, four blocks are integrated into one block. When inter-prediction is used, further, a motion vector of an integrated block is determined based on motion vectors of four blocks before integration. The block expansion unit 370 sets, for example, a motion vector of any block of the four blocks before integration as a motion vector of one integrated block or sets an average vector of motion vectors of the four blocks as a motion vector of one integrated block.

PTL 4 describes that a plurality of basic CUs included in an integration area that is an area of N×N pixels including a plurality of basic blocks are integrated as one new CU, and an encode string is generated based on the new CU after integration. A plurality of basis CUs included in an integrated area are integrated when all of a plurality of basis CUs and a plurality of basis PUs belonging to an integrated area have the same block size and pieces of prediction information of all the basis PUs included in the integrated area are the same.

CITATION LIST

Patent Literature

PTL 1: International Publication No. WO 2011/033853
PTL 2: International Publication No. WO 2012/105406
PTL 3: International Publication No. WO 2016/116984
PTL 4: Japanese Unexamined Patent Application Publication No. 2015-181225

Non Patent Literature

NPL 1: IUT-T recommendation H.265 High efficiency video coding, April 2015

SUMMARY OF INVENTION

Technical Problem

With regard to intra-prediction, a configuration illustrated in FIG. 15 is conceivable as an achieved example of the prediction mode/block size determination unit 307 in the first video encoding device.

In the first video encoding device illustrated in FIG. 15, the prediction mode/block size determination unit 307 includes a 4×4 intra-prediction image generation unit 311, an 8×8 intra-prediction image generation unit 312, a 16×16 intra-prediction image generation unit 313, a 32×32 intra-prediction image generation unit 314, and a 64×64 intra-prediction image generation unit 315. Each intra-prediction image generation unit sequentially generates a prediction image for each of usable prediction modes. A usable prediction mode includes all (35 modes) as one example, however, when prediction modes are narrowed down, for example, by using a predetermined narrowing-down method, is a number (less than 35) after the narrowing-down, and, when a number (less than 35) of usable prediction modes are previously determined, is the number.

The prediction mode/block size determination unit 307 further includes residual calculation units 321 to 325 that calculate a difference (residual) between an input image and a prediction image generated by an associated prediction image generation unit among the 4×4 intra-prediction image generation unit 311, the 8×8 intra-prediction image generation unit 312, the 16×16 intra-prediction image generation unit 313, the 32×32 intra-prediction image generation unit 314, and the 64×64 intra-prediction image generation unit 315. The prediction mode/block size determination unit 307 further includes bin number calculation units (bin number determination units) 331 to 335 that calculate the bin number by using an encode volume determined according to a residual calculated by an associated residual calculation unit among the residual calculation units 321 to 325 and a handled prediction mode.

The prediction mode/block size determination unit 307 includes cost calculation units 341 to 345 that calculate an encoding cost by using a calculation result of an associated residual calculation unit among the residual calculation units 321 to 325 and the bin number calculated by an associated bin number calculation unit among the bin number calculation units 331 to 335. The prediction mode/block size determination unit 307 further includes prediction mode selection units 351 to 355 that select a prediction mode, based on an encoding cost calculated by an associated cost calculation unit among the cost calculation units 341 to 345. The prediction mode/block size determination unit 307 further includes a size selection unit 360 that selects a block size, based on prediction modes selected by the prediction mode selection units 351 to 355.

The prediction mode/block size determination unit 307 illustrated in FIG. 15 divides, for example, a block (CTU) of a size of 64×64 into a block of a size of 4×4, a block of a size of 8×8, a block of a size of 16×16, a block of a size of 32×32, and a block of a size of 64×64, and thereafter executes intra-prediction, calculates a residual, calculates the bin number, calculates an encoding cost, and selects a prediction mode for each block after the division. A block of a size of 64×64 is a block upon no division of a CTU.

Then, the size selection unit 360 identifies a prediction mode having a minimum encoding cost. In other words, a combination of prediction mode selection units that causes an encoding cost to be minimum among the prediction mode selection units 351 to 355, i.e., a quadtree structure of a CTU is identified. The prediction mode selection units 351 to 355 are provided correspondingly to a block size (i.e., a block shape), and therefore the size selection unit 360 identifies a prediction mode selection unit and thereby can determine an optimum quadtree structure.

In the first video encoding device, a circuit size of the prediction mode/block size determination unit 307 increases. The reason is that, in order to complete encoding processing in a predetermined period of time, as exemplarily illustrated in FIG. 15, it is necessary to provide a circuit for executing prediction, calculating a residual, calculating an encoding cost, and determining a prediction mode for blocks of sizes of 4×4, 8×8, 16×16, 32×32, and 64×64, and execute processing in parallel for the blocks of sizes of 4×4, 8×8, 16×16, 32×32, and 64×64. As a result, when the prediction mode/block size determination unit 307 is achieved by using an integrated circuit such as a field-programmable gate array (FPGA), there is a possibility that it is difficult to meet a request that a size (area) of an integrated circuit is not increased.

In the second video encoding device, a circuit size of the prediction mode/block size determination unit 307 is small, compared with the first video encoding device. However, the second video encoding device has a large circuit size, compared with the third video encoding device.

The third video encoding device produces an advantageous effect that, while a circuit size smaller than in the first video encoding device and the second video encoding device is achieved, a bit volume (the bin number) of data after encoding can be reduced. However, such an advantageous effect is produced when there are a large number of chances that a plurality of blocks are integrated. When there are a small number of chances that a plurality of blocks are integrated, an advantageous effect that the bin number can be reduced is not produced. It is difficult for even the technique of PTL 4 to produce such an advantageous effect.

An object of the present invention is to provide an intra-prediction mode determination method, an intra-prediction mode determination device, and an intra-prediction mode determination program that do not increase a circuit size while reducing the bin number of data after encoding.

Solution to Problem

An intra-prediction mode determination method according to an aspect of the present invention is applied to a video encoding device that recursively divides a block of an input video into small blocks and encodes the small blocks by intra-prediction or inter-frame prediction, and the method includes: evaluating encoding costs of a plurality of prediction mode candidates, based on a residual in a prediction mode candidate and a bin number that is a count of bins allocated to the prediction mode candidate, for each of the small blocks in only one size of sizes able to be taken by the small blocks; selecting, based on an evaluation result, an intra-prediction mode from the plurality of prediction mode candidates; and increasing a bin number for a specific prediction mode candidate when evaluating the encoding costs.

An intra-prediction mode determination device according to an aspect of the present invention is applied to a video encoding device that recursively divides a block of an input video into small blocks and encodes the small blocks by intra-prediction or inter-frame prediction, and the intra-prediction mode determination device includes: prediction mode selection means for evaluating encoding costs of a plurality of prediction mode candidates, based on a residual in a prediction mode candidate and a bin number that is a count of bins allocated to the prediction mode candidate, for each of the small blocks, and selecting, based on an evaluation result, an intra-prediction mode from the plurality of prediction mode candidates; and bin number adjustment means for increasing a bin number for a specific prediction mode candidate when the prediction mode selection means evaluates the encoding costs, wherein the prediction mode selection means and the bin number adjustment means are included for only one size of sizes able to be taken by the small blocks.

A storage medium according to an aspect of the present invention stores an intra-prediction mode determination program that causes a computer implemented in a video encoding device that recursively divides a block of an input video into small blocks and encodes the small blocks by intra-prediction or inter-frame prediction, to execute: processing of evaluating encoding costs of a plurality of prediction mode candidates, based on a residual in a prediction mode candidate and a bin number that is a count of bins allocated to the prediction mode candidate, for each of the small blocks in only one size of sizes able to be taken by the small block; processing of selecting, based on an evaluation result, an intra-prediction mode from the plurality of prediction mode candidates; and processing of increasing a bin number for a specific prediction mode candidate when evaluating the encoding costs.

Advantageous Effects of Invention

According to the present invention, while the bin number of data after encoding is reduced, it is possible that a circuit size is not increased.

BRIEF DESCRIPTION OF DRAWINGS

FIG. 11 is an illustrative diagram illustrating a PU division shape of a CU.

EXAMPLE EMBODIMENT

First Example Embodiment

Figure 1:
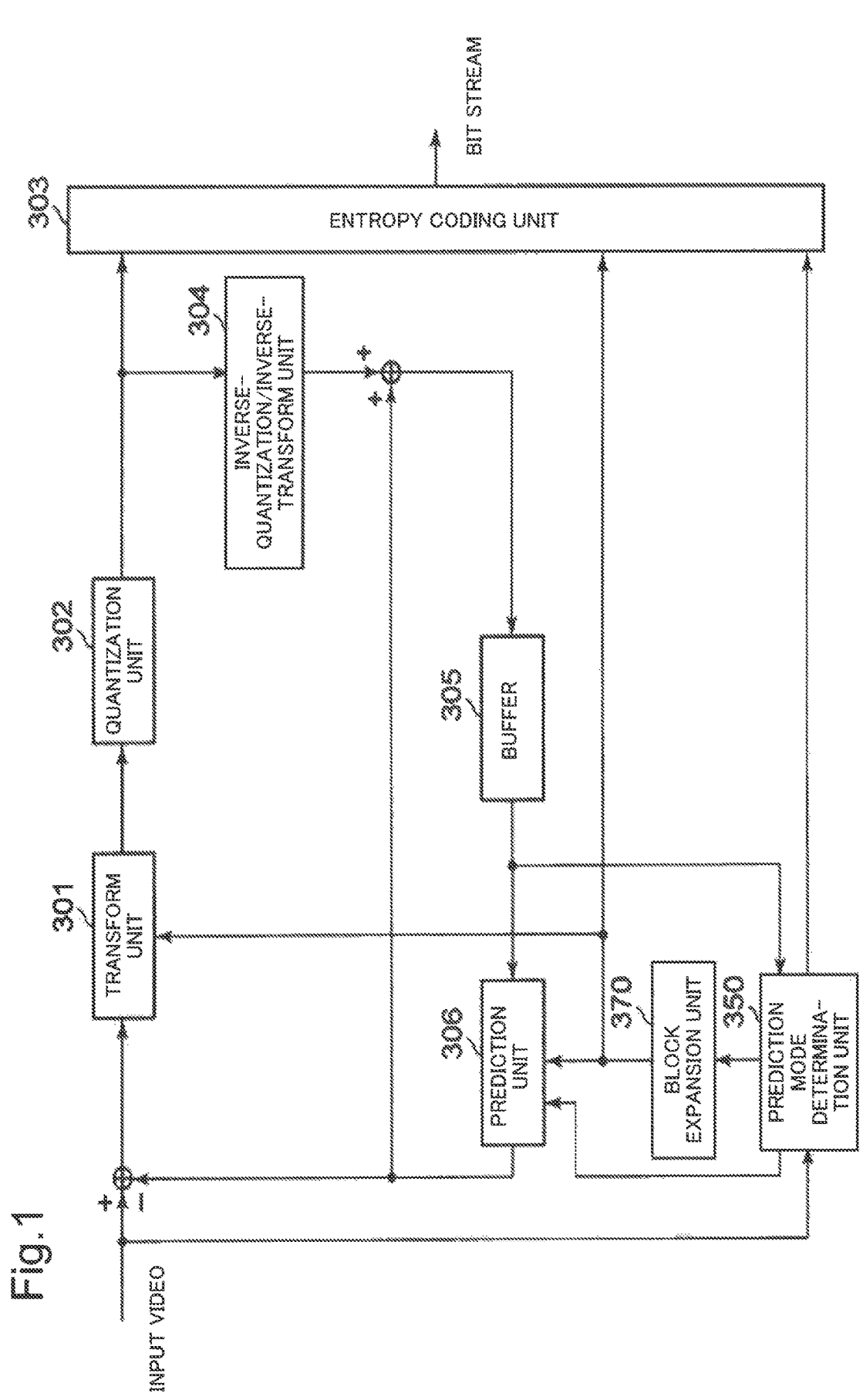
FIG. 1 is a block diagram illustrating one example of a video encoding device including a prediction mode determination device.

FIG. 1 is a block diagram illustrating one example of a video encoding device including a prediction mode determination device according to the present invention. In FIG. 1 and other drawings, a direction of transmission of data is not limited to a direction indicated by an arrow.

The video encoding device illustrated in FIG. 1 includes a transform unit 301, a quantization unit 302, an entropy encoding unit 303, an inverse-quantization/inverse-transform unit 304, a buffer 305, a prediction unit 306, a block expansion unit 370, and a prediction mode determination unit 350.

Figure 13:
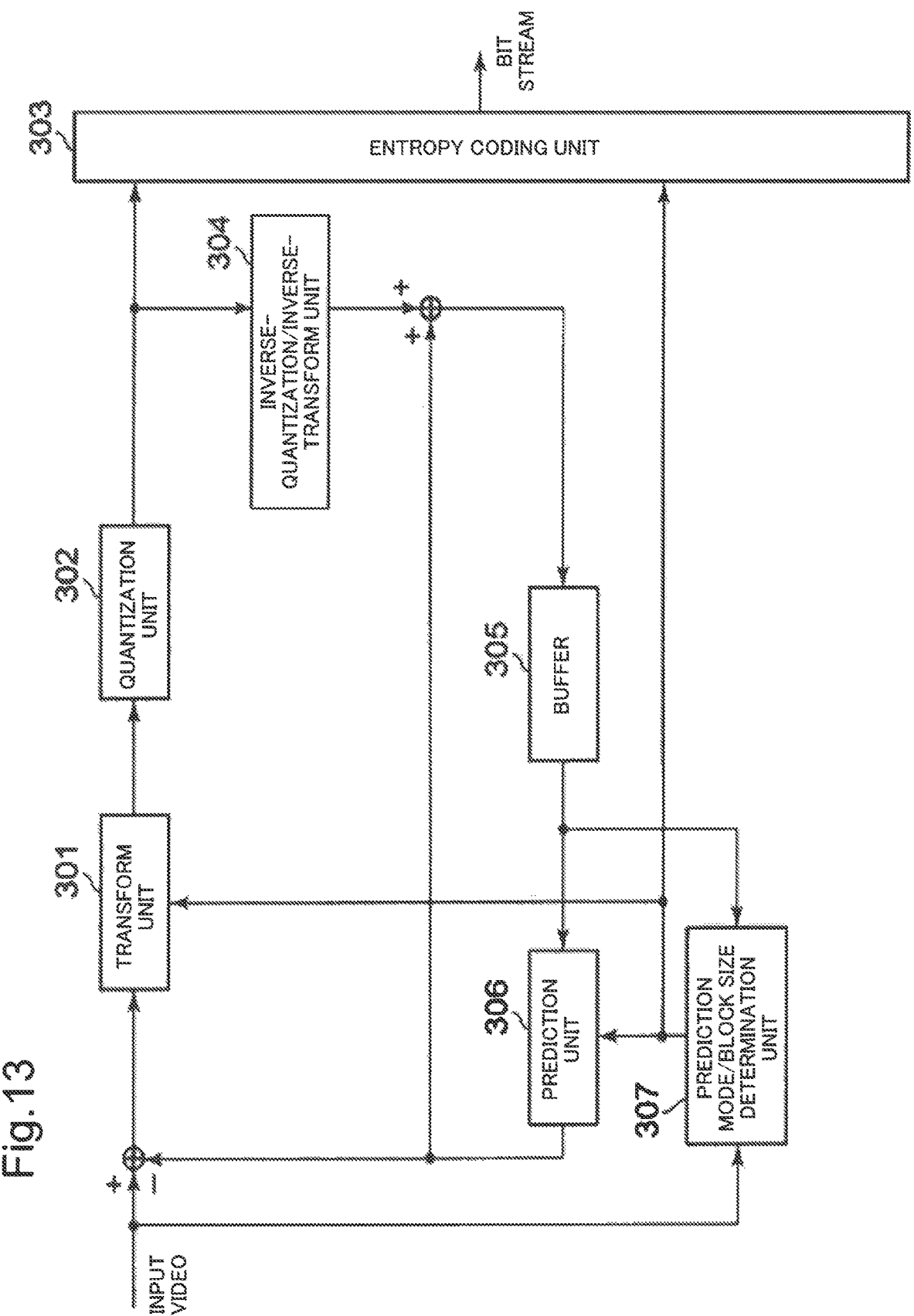
FIG. 13 is a block diagram illustrating one example of a general video encoding device.
Figure 14:
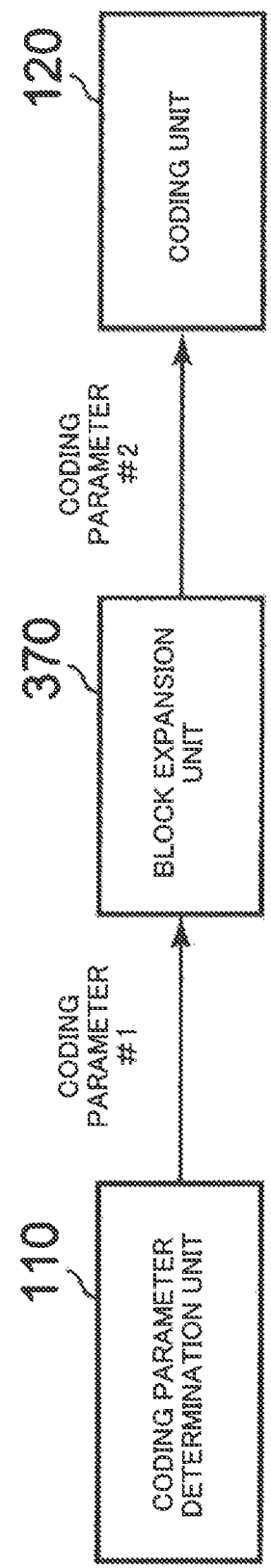
FIG. 14 is a block diagram illustrating a configuration of a video encoding device including a block expansion unit.

Functions of the transform unit 301, the quantization unit 302, the entropy encoding unit 303, the inverse-quantization/inverse-transform unit 304, the buffer 305, and the prediction unit 306 are the same as the function illustrated in FIG. 13.

The prediction mode determination unit 350 executes block division and determines an encoding mode (intra-prediction, inter-prediction, a skip mode, or the like) of each block acquired by the division and a prediction mode of intra-prediction.

The block expansion unit 370 expands a block when a predetermined condition is satisfied. In other words, a plurality of blocks are integrated into one block.

Figure 2:
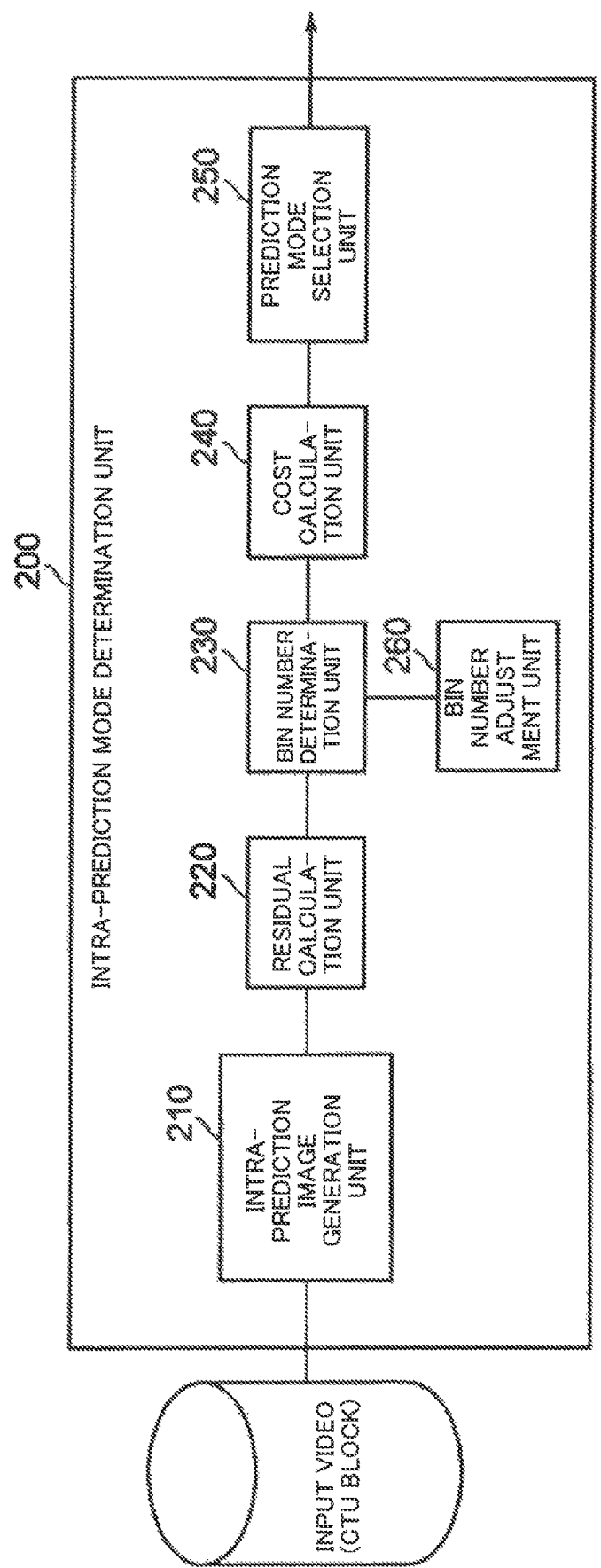
FIG. 2 is a block diagram illustrating a configuration example of an intra-prediction mode determination unit.

FIG. 2 is a block diagram illustrating a configuration example of an intra-prediction mode determination unit 200 included in the prediction mode determination unit 350. The intra-prediction mode determination unit 200 includes an intra-prediction image generation unit 210, a residual calculation unit 220, a bin number determination unit 230, a cost calculation unit 240, a prediction mode selection unit 250, and a bin number adjustment unit 260.

Figure 15:
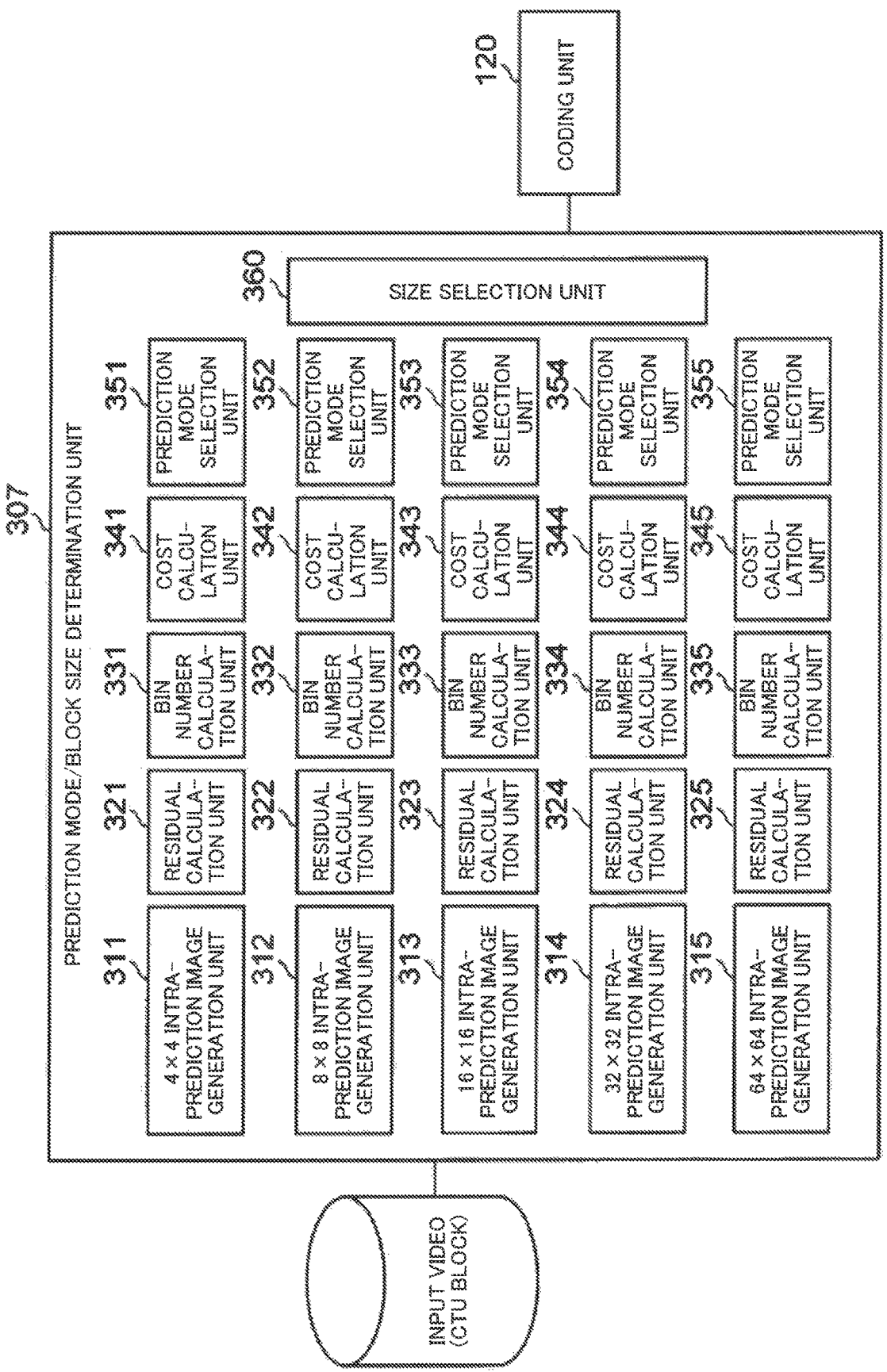
FIG. 15 is a block diagram illustrating a configuration of a prediction mode/block size determination unit.

The intra-prediction mode determination unit 200 illustrated in FIG. 2 corresponds to a portion for executing processing for a block size of one type (e.g. 4×4) in the prediction mode/block size determination unit 307 illustrated in FIG. 15. When a block size of 4×4 is considered as an example, the intra-prediction mode determination unit 200 includes functions of a 4×4 intra-prediction image generation unit 311, a residual calculation unit 321, a bin number calculation unit 331, a cost calculation unit 341, and a prediction mode selection unit 351.

When compared with a video encoding device including the prediction mode/block size determination unit 307 illustrated in FIG. 15, the video encoding device of the present example embodiment has a small circuit size for executing intra-prediction mode determination processing.

A size of a target of processing executed by the intra-prediction mode determination unit 200 is preferably small. The reason is that when a size of a target is small, a circuit size decreases.

However, when the intra-prediction mode determination unit 200 is achieved by an integrated circuit and can be achieved within a range of an allowable circuit size, a size (e.g. 8×8) larger than 4×4 that is a minimum size may be a size to be processed. In the present example embodiment, while in the intra-prediction mode determination unit 200, only a portion for executing processing for a size of one type is run, a portion for executing processing for sizes of types (e.g. 4×4 and 8×8) more than one type may be mounted when the intra-prediction mode determination unit 200 is achieved by an integrated circuit and can be achieved within a range of an allowable circuit size.

The minimum size is not limited to 4×4. In a video encoding device having, for example, a block size of 8×8 as a minimum size, the minimum size is set to be 8×8 as a minimum size.

Figure 3:
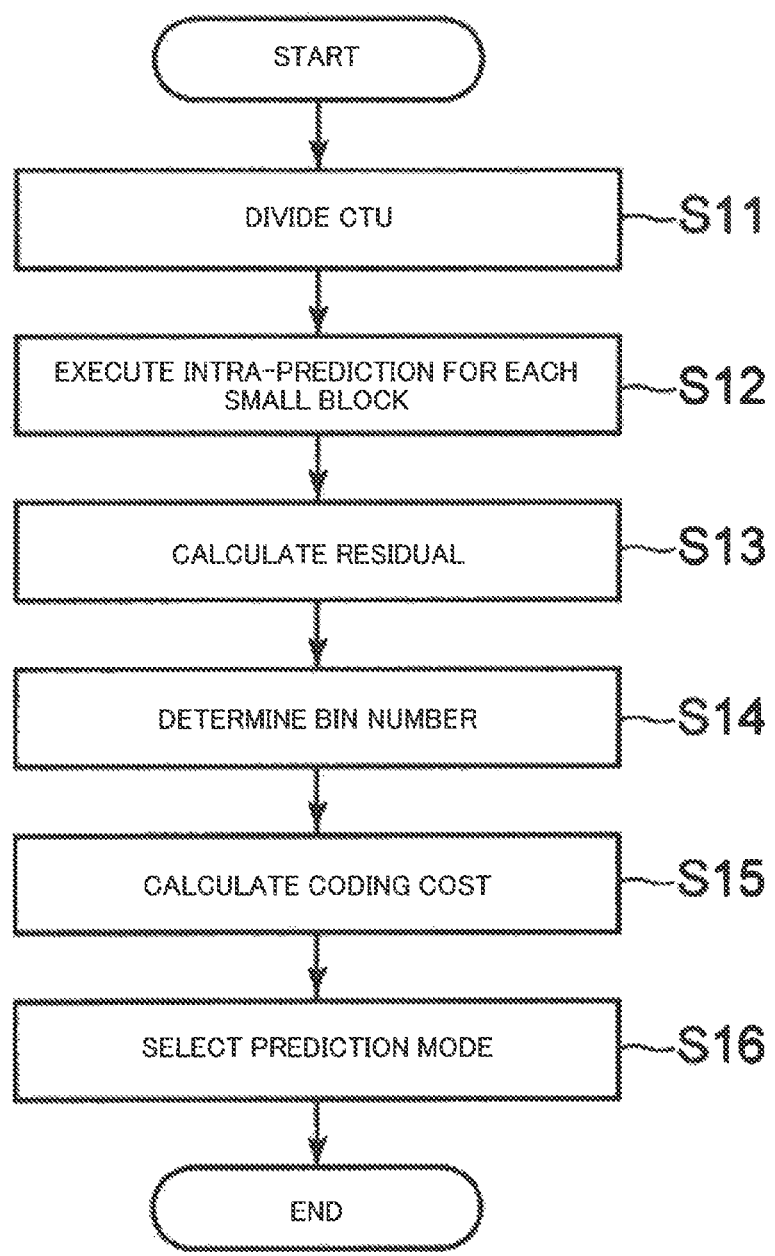
FIG. 3 is a flowchart illustrating an operation of an intra-prediction mode determination unit.

Next, with reference to a flowchart of FIG. 3, an operation of the intra-prediction mode determination unit 200 is described. As described above, in the present example embodiment, the intra-prediction mode determination unit 200 is configured to execute processing for a 4×4 size.

The intra-prediction mode determination unit 200 divides each input CTU (assumed to be 64×64 pixels) into blocks (PUs) of a 4×4 size (step S11). A block acquired by division is referred to as a small block. In a precise sense, a CTU is divided into CUs, followed by being divided into PUs.

In the intra-prediction mode determination unit 200, the intra-prediction image generation unit 210 executes intra-prediction for each small block (step S12). In other words, the intra-prediction image generation unit 210 generates a prediction image for each prediction mode with respect to each small block. The residual calculation unit 220 calculates a residual for the prediction image generated by the intra-prediction image generation unit 210 (step S13). A prediction mode handled by the intra-prediction image generation unit 210, the residual calculation unit 220, the bin number determination unit 230, and the cost calculation unit 240 is not a final predication mode, and therefore, hereinafter, a prediction mode handled by these units is referred to as a prediction mode candidate.

The bin number determination unit 230 determines the bin number associated with a prediction mode candidate (step S14). The bin number in the present example embodiment is described later.

The cost calculation unit 240 calculates an encoding cost (Cost) of each prediction mode, for example, by following equation (2), by using the residual calculated by the residual calculation unit 220 and the bin number (bins) determined by the bin number determination unit 230 for a prediction mode (step S15).

The intra-prediction image generation unit 210 sequentially generates, with respect to each small block, a prediction image according to all usable prediction mode candidates. Therefore, the residual calculation unit 220, the bin number determination unit 230, and the cost calculation unit 240 sequentially execute processing according to each usable prediction mode candidate. Hereinafter, expression of a "prediction mode being handled" indicates a prediction mode candidate being a processing target of the intra-prediction image generation unit 210, the residual calculation unit 220, the bin number determination unit 230, and the cost calculation unit 240 at a time of actually executing processing.

$$\text{Cost}=\text{SAD}+\lambda*\text{bins} \quad (2)$$

In equation (2), a sum of absolute differences (SAD) is an absolute value sum for a residual with respect to each pixel. $\lambda$ is a weighting value and is determined based on a tradeoff between image quality and an encode volume. When an encode volume is intended to be decreased even if image quality slightly decreases, $\lambda$ is increased. Instead of an SAD, for example, a sum of squared differences (SSD) may be used. Equations after equation (2) are represented by using an operator of the C++ language as necessary.

In HEVC, an encoding method referred to as a most probable mode (MPM) can be used. As an MPM, prediction mode candidates of three types are set based on a prediction mode of a PU (adjacent PU) adjacent to a prediction target PU. A first prediction mode candidate (designated as an MPM[0]) of the prediction modes of three types is, for example, a prediction mode of a left-adjacent PU. A second prediction mode candidate (designated as an MPM[1]) is a prediction mode of an upper-adjacent PU (see FIG. 4).

In the present example embodiment, the intra-prediction mode determination unit 200 uses an MPM when determining a prediction mode.

Figure 4:
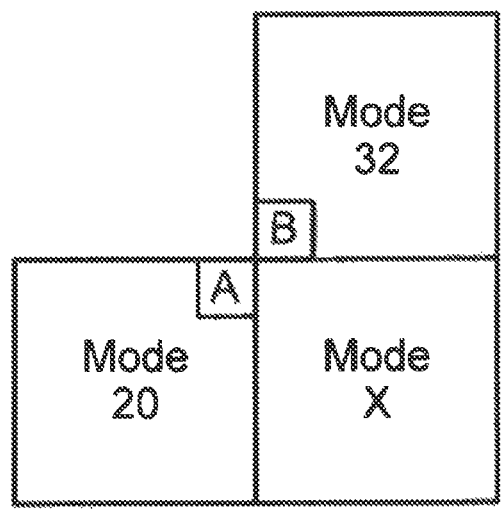
FIG. 4 is an illustrative diagram for illustrating an MPM.

In FIG. 4, a case in which an MPM[0] is a prediction mode where a prediction mode number is "20" and an MPM[1] is a prediction mode where a prediction mode number is "32" is exemplarily illustrated. A block expressed with "ModeX" is an evaluation target PU (a PU to be determined as a prediction mode) and "ModeX" indicates a prediction mode candidate handled at a time of actually executing processing. In FIG. 4, rectangles assigned with "A" and "B" represent pixels adjacent to an evaluation target PU.

When an MPM[0] and an MPM[1] are not matched, a third prediction mode candidate (designated as an MPM[2]) is set. As an MPM[2], planar prediction where a prediction mode number is "0", DC prediction where a prediction mode number is "1", or angle intra-predication of a prediction mode number "26" is settable (see 8.4.2 of NPL 1). In the present example embodiment, a case where an MPM[2] is planar prediction is employed as an example.

Prediction modes corresponding to an MPM[0], an MPM[1], and an MPM[2] are sequentially generated as an MPM list and stored.

A video encoding device includes, when a prediction mode of an MPM has been selected as a prediction mode for a PU, a prev_intra_luma_pred_flag that is a flag specifying whether to use an MPM and an mpm_idx (1 bin or 2 bins) indicating whether a prediction mode of which adjacent PU is applied to a prediction target PU in a bit stream (see 7.3.8.5 of NPL 1).

When a prediction mode of an MPM has not been selected as a predication mode for a PU, the video encoding device includes a rem_intra_luma_pred_mode of 5 bins that is data (syntax element) representing a prediction mode selected as a prev_intra_luma_pred_flag in a bit stream. Therefore, when a PU is determined as an MPM, a data volume of a prediction mode in a bit stream decreases.

In the present example embodiment, the bin number is basically allocated to a prediction mode candidate, for example, as follows. X represents a prediction mode of an evaluation target PU (a prediction mode of an evaluation target). "||" indicates "or". "Otherwise" represents a prediction mode candidate other than an MPM.

Bin number=2 if (X==MPM[0])

3 if (X==MPM[1]||MPM[2])

6 otherwise  (3)

When the bin number determination unit 230 determines the bin number of each prediction mode candidate in accordance with equation (3), the cost calculation unit 240 calculates, when treating an MPM[0] as a predication mode candidate of an evaluation target PU in processing of step S15, an encoding cost in accordance with equation (2) by setting the bin number as 2. When as prediction mode candidate of an evaluation target PU, an MPM[1] or an MPM[2] is being handled, an encoding cost is calculated in accordance with equation (2) by setting the bin number as 3.

The bin number=2 for an MPM[0] is based on that a prev_intra_luma_pred_flag is expressed by 1 bin (1 bit) and the MPM[0] is expressed by 1 bin (1 bit). The bin number=3 for an MPM[1]||MPM[2] is based on that a prev_intra_luma_pred_flag is expressed by 1bin (1 bit) and the MPM[1]||MPM[2] is expressed by 2 bins (2 bits). The bin number in the case of no MPM=6 is based on that a prev_intra_luma_pred_flag is expressed by 1bin (1 bit) and a rem_intra_luma_pred_mode corresponding to an index for specifying a prediction mode other than an MPM is expressed by 5 bins (5 bits).

In the present example embodiment, the video encoding device includes the block expansion unit 370. As described above, the block expansion unit 370 is provided in order to reduce the bin number of data after encoding by integrating small blocks. The bin number adjustment unit 260 includes a function of adjusting the bin number in such a way that a chance that the block expansion unit 370 integrates small blocks increases. In other words, the bin number adjustment unit 260 determines whether each prediction mode candidate contributes to block size expansion executed by the block expansion unit 370 or not and adjusts the bin number for a prediction mode candidate when it is determined that no contribution is made to block size expansion executed by the block expansion unit 370. Specifically, the bin number adjustment unit 260 instructs the bin number determination unit 230 to increase the bin number.

In the present example embodiment (first example embodiment), it is assumed that each prediction mode candidate that is not an MPM does not contribute to block size expansion (does not increase a chance that small clocks are integrated).

Therefore, in processing of step S14, actually, the bin number determination unit 230 does not determine the bin number, based on equation (3) described above but determines the bin number, based on following equation (4). In equation (4), "adjust" represents an adjusted number (increased number) of the bin number output by the bin number adjustment unit 260. A value of "adjust" is defined based on an increased number of the bin number generated when block size expansion by the block expansion unit 370 is not executed.

The bin number=2 if (X==MPM[0])

3 if (X==MPM[1]||MPM[2])

6+adjust otherwise    (4)

The prediction mode selection unit 250 determines, as a prediction mode, a prediction mode candidate corresponding to a minimum encoding cost among encoding costs of predication mode candidates calculated by the cost calculation unit 240 (step S16).

In the present example embodiment, the prediction mode selection unit 250 more easily selects an MPM as a prediction mode than when the bin number adjustment unit 260 does not exist. The reason is that an encoding cost of a prediction mode candidate other than an MPM becomes higher than a case where the bin number adjustment unit 260 does not exist.

The block expansion unit 370 integrates, when, as one example, prediction modes of four small blocks configuring a quadtree are matched, the four small blocks into one block. In the present example embodiment, a matter that a quadtree is configured indicates inclusion into one PU division shape (see FIG. 11: e.g. an N×N block). In other words, a matter that a quadtree is configured indicates that four small blocks are based on one node in one higher hierarchy of a quadtree structure. In other words, four small blocks correspond to child nodes based on one node of a quadtree structure.

The block expansion unit 370 may use another condition as a condition for integrating small blocks into one block. As an example of another condition, for example, matching of three or more of four prediction modes is cited.

In the present example embodiment, a possibility that the block expansion unit 370 integrates small blocks in order to reduce the bin number of data after encoding increases. The reason is that when an MPM is selected in advance, a possibility that a prediction mode of a block expressed with ModeX is matched with a prediction mode of another small block is relatively high.

In other words, in the present example embodiment, the bin number adjustment unit 260 increases the bin number in such a way that a selection rate of an intra-prediction mode for integrating small blocks increases.

The reason why a prediction mode candidate considered as not contributing to block size expansion executed by the block expansion unit 370 is not excluded but is caused to be an evaluation target by increasing the bin number is that there is a possibility that a total encoding cost is more reduced by selection of the prediction mode candidate without expanding a block size than by expansion of a block size. This matter is similar in other example embodiments.

Second Example Embodiment

In a second example embodiment, a determination criterion whether to contribute to block size expansion in the first example embodiment or not is weighted with a condition.

A configuration of a video encoding device of the second example embodiment is the same as the configuration illustrated in FIG. 1.

In the present example embodiment, an evaluation target PU is weighted with a condition according to whether to be located on an upper side or located on a lower side in one N×N block (in a quadtree, i.e. in one PU division shape). The condition is represented, for example, as follows.

if (an upper-side block in a quadtree){
    if(X!=A)bin number+=adjust;
}else{//lower side
    if(X!=B)bin number+=adjust;
}
    (5)

"A" represents a prediction mode of a PU adjacent to a left side of an evaluation target PU and "B" represents a prediction mode of a PU adjacent to an upper side of the evaluation target PU.

In the present example embodiment, while the bin number adjustment unit 260 is configured to output, when outputting "adjust" represented by equation (4), the "adjust" by being further weighted with a value of "adjust" based on the condition of (5) described above, the bin number adjustment unit 260 may output "adjust", based on only the condition of (5) described above without using equation (4). The bin number adjustment unit 260 may output, when either one of the conditions of equation (4) and condition (5) is satisfied, "adjust" based on the condition.

Figure 5A:
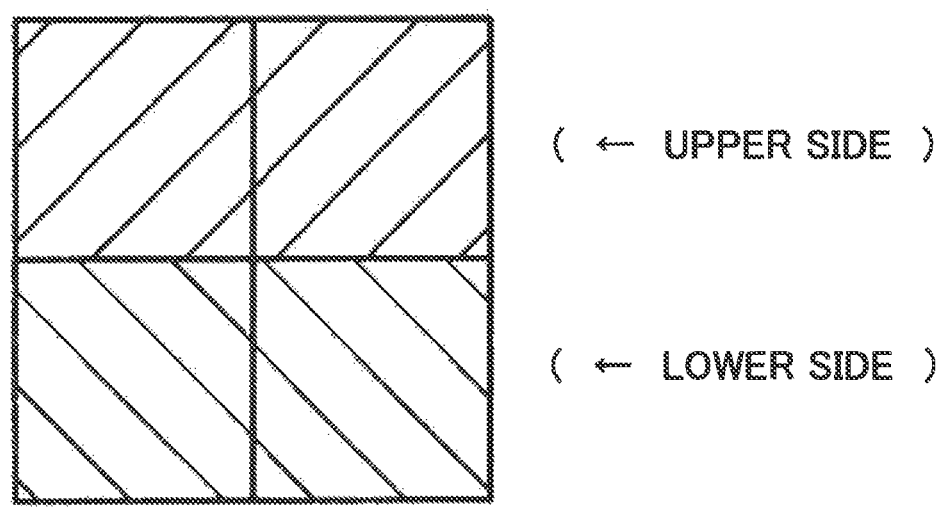
FIG. 5A is an illustrative diagram for illustrating an upper-side block and a lower-side block.
Figure 5B:
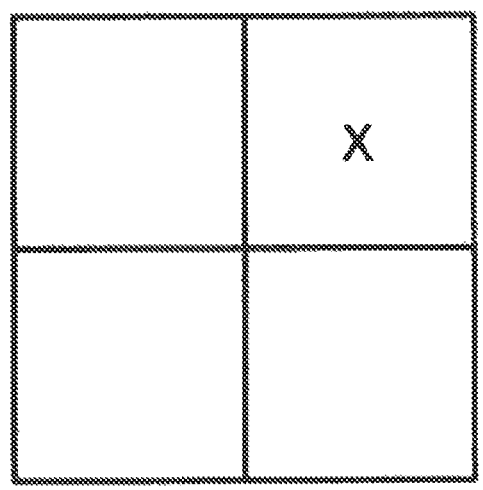
FIG. 5B is an illustrative diagram for illustrating an upper-side block and a lower-side block.
Figure 5C:
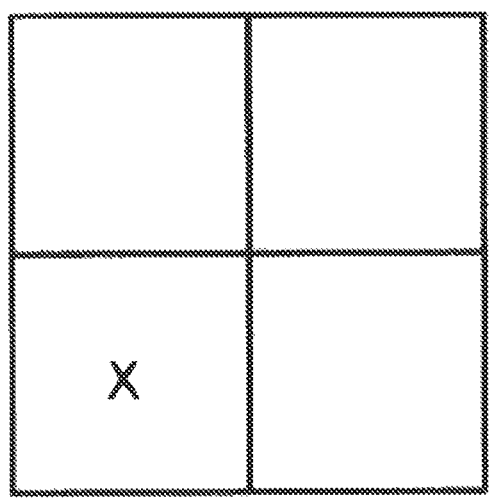
FIG. 5C is an illustrative diagram for illustrating an upper-side block and a lower-side block.

The bin number adjustment unit 260 outputs, when an evaluation target PU is located on an upper side in a quadtree (see FIG. 5B), "adjust" defined by (5) described above to the bin number determination unit 230 when the prediction mode candidate same as a prediction mode of a PU adjacent on a left side is being handled. Definitions of an "upper side" and a "left side" are illustrated in FIG. 5A. In FIGS. 5B and 5C, "X" represents an evaluation target PU.

The bin number adjustment unit 260 outputs, when an evaluation target PU is located on a lower side in a quadtree (see FIG. 5C), "adjust" defined by (5) described above to the bin number determination unit 230 when the prediction mode candidate same as a prediction mode of a PU adjacent on an upper side is being handled.

While being generally the same as a value of "adjust" in the first example embodiment (a value of "adjust" in equation (4)), a value of "adjust" in equation (5) may be different from a value of "adjust" in the first example embodiment.

The bin number adjustment unit 260 outputs "adjust" defined by (5) described above, and thereby when an evaluation target PU is located on a lower side in a quadtree (see FIG. 5C), a possibility that a prediction mode of the evaluation target PU is the same as a prediction mode of a PU adjacent on an upper side increases. The reason is that the bin number associated with a prediction mode candidate different from a prediction mode of a PU adjacent on an upper side increases and an encoding cost increases.

When an evaluation target PU is located on an upper side in a quadtree (see FIG. 5B), a possibility that a prediction mode of the evaluation target PU is the same as a prediction mode of a PU adjacent on a left side increases. The reason is that the bin number associated with a prediction mode candidate different from a prediction mode of a PU adjacent on a left side increases and an encoding cost increases.

In other words, when an evaluation target PU is located on a lower side in a quadtree, a prediction mode candidate different from a prediction mode of a PU adjacent on an upper side is considered as not contributing to block size expansion executed by the block expansion unit 370. When an evaluation target PU is located on an upper side in a quadtree, a prediction mode candidate different from a prediction mode of a PU adjacent on a left side is considered as not contributing to block size expansion executed by the block expansion unit 370.

Therefore, also in the present example embodiment, a possibility that the block expansion unit 370 integrates small blocks in order to reduce the bin number of data after encoding increases.

Third Example Embodiment

Next, a third example embodiment is described. A configuration of a video encoding device of the third example embodiment is the same as the configuration illustrated in FIG. 1.

In the second example embodiment, a possibility that when an evaluation target PU is located on a lower side in a quadtree, a prediction mode of the evaluation target PU is the same as a prediction mode of a PU adjacent on an upper side increases.

Figure 6:
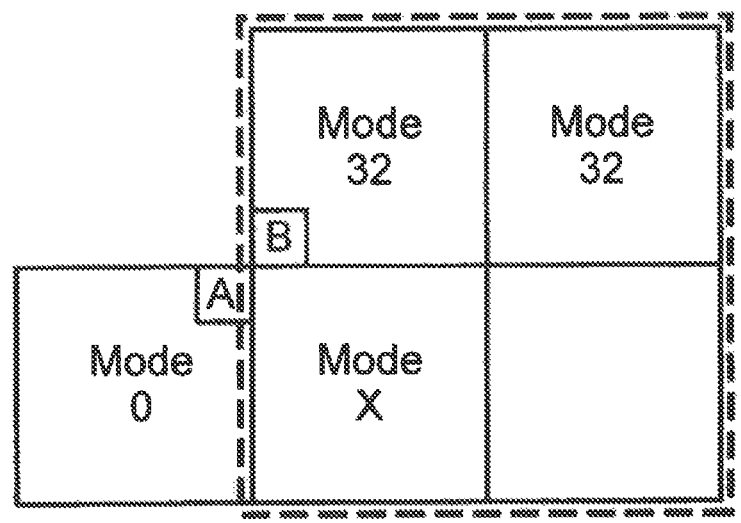
FIG. 6 is an illustrative diagram for illustrating prediction mode candidates contributing to block size expansion.

As illustrated in FIG. 6, when an evaluation target PU is located at the left of a lower side (i.e. at the lower left) in a quadtree, in the first example embodiment, a possibility that an MPM[0] is selected as a prediction mode is relatively high. In the example illustrated in FIG. 6, a prediction mode candidate contributing to block expansion executed by the block expansion unit 370 is a prediction mode candidate that is the same as a prediction mode of a block adjacent on an upper side. In FIG. 6, "X" represents an evaluation target PU. A rectangle of a dashed line indicates that four PUs configure a quadtree (configures one PU division shape).

Therefore, in the present example embodiment, when an evaluation target PU is located at the lower left in one PU division shape, the bin number adjustment unit 260 outputs "adjust" based on following equation (6).

$$
\begin{aligned}
\text{The bin number} = &2 && \text{if } (X==MPM[0]\&\&X==B) \\
&2+\text{adjust} && \text{if}(X==MPM[0]\&\&X!=B) \\
&3 && \text{if}((X==MPM[1]\|MPM[2])\&\&X==B) \\
&3+\text{adjust} && \text{if}((X==MPM[1]\|MPM[2])\&\&X!=B) \\
&6+\text{adjust} && \text{otherwise}
\end{aligned} \quad (6)
$$

In other words, when an evaluation target PU is located at the lower left in one PU division shape, the bin number adjustment unit 260 does not output "adjust" in which when an MPM[0] is being handled as a prediction mode candidate, the prediction mode candidate is the same as a prediction mode of a PU adjacent on an upper side but outputs "adjust" when the prediction mode candidate is different from a prediction mode of a PU adjacent on an upper side. Therefore, the bin number determination unit 230 determines the bin number as 2 in which when an MPM[0] is being handled as a prediction mode candidate, the prediction mode candidate is the same as a prediction mode of a PU adjacent on an upper side and determines the bin number as 2+adjust when the prediction mode candidate is different from a prediction mode of a PU adjacent on an upper side.

When an evaluation target PU is located at the lower left in one PU division shape, the bin number adjustment unit 260 does not output "adjust" in which when an MPM[1] or an MPM[2] is being handled as a prediction mode candidate, the prediction mode candidate is the same as a prediction mode of a PU adjacent on an upper side but outputs "adjust" when the prediction mode candidate is different from a prediction mode of a PU adjacent on an upper side. Therefore, the bin number determination unit 230 determines the bin number as 3 in which when an MPM[1] or an MPM[2] is being handled as a prediction mode candidate, the prediction mode candidate is the same as a prediction mode of a PU adjacent on an upper side and determines the bin number as 3+adjust when the prediction mode candidate is different from a prediction mode of a PU adjacent on an upper side.

As a result, a possibility that when an evaluation target PU is located at the lower left in one PU division shape, a prediction mode of the evaluation target PU is the same as a prediction mode of a PU adjacent on an upper side increases. The reason is that the bin number associated with a prediction mode candidate different from a prediction mode of a PU adjacent on an upper side increases and thereby an encoding cost increases.

In other words, when an evaluation target PU is located at the lower left in one PU division shape, a prediction mode candidate different from a prediction mode of a PU adjacent on an upper side is considered as not contributing to block size expansion executed by the block expansion unit 370.

In the intra-prediction mode determination unit 200, a processing order of four blocks of a size of 4×4 is previously determined, and therefore the bin number adjustment unit 260 can easily determine whether a PU of an evaluation target is located at the lower left or not.

While being generally the same as a value of "adjust" (a value of "adjust" in equation (4)) in the first example embodiment, a value of "adjust" in equation (6) may be different from a value of "adjust" in the first example embodiment.

Also in the present example embodiment, a possibility that the block expansion unit 370 integrates small blocks in order to reduce the bin number of data after encoding increases.

Fourth Example Embodiment

Next, a fourth example embodiment is described. A configuration of a video encoding device of the fourth example embodiment is the same as the configuration illustrated in FIG. 1.

As illustrated in FIG. 6, when an evaluation target PU is located at the left of a lower side (i.e., at the lower left) in one PU division shape, there is a possibility that an MPM[0] is selected as a prediction mode.

Therefore, in the present example embodiment, when an evaluation target PU is located at the lower left in one PU division shape, the bin number adjustment unit 260 outputs "adjust" based on following equation (7).

$$
\begin{aligned}
\text{The bin number} = &2 && \text{if}(X==MPM[1]) \\
&3 && \text{if}(X==MPM[0]\|MPM[2]) \\
&6+\text{adjust} && \text{otherwise}
\end{aligned} \quad (7)
$$

When an evaluation target PU is not located at the lower left in one PU division shape, the bin number determination unit 230 determines the bin number, for example, based on equation (4) described above.

A difference between equation (4) and equation (7) is that an MPM[0] (a prediction mode of a PU adjacent on a left side) and an MPM[1] (a prediction mode of a PU adjacent on an upper side) are switched.

While always determining the bin number, based on equation (4) described above, the bin number determination unit 230 may determine the bin number by setting an MPM[0] as a prediction mode of a PU adjacent on an upper side and setting an MPM[1] as a prediction mode of a PU adjacent on a left side when an evaluation target PU located at the lower left in a quadtree is targeted.

In the present example embodiment, when an evaluation target PU is located at the lower left in a quadtree, the bin number is increased when a prediction mode candidate being handled and a prediction mode of a PU adjacent on a left side are the same. Specifically, when an evaluation target PU is located on the lower left in one division shape, a prediction mode (MPM[1]) of a block adjacent on an upper side is caused to be an MPM allocated with a smallest bin number. As a result, a probability that a prediction mode of an evaluation target PU is determined as a prediction mode of a PU adjacent on a left side decreases. In other words, also in the present example embodiment, a probability that the block expansion unit 370 integrates small blocks in order to reduce the bin number of data after encoding increases.

As described above, in the example embodiments, the intra-prediction mode determination unit 200 is configured to execute processing for a minimum block size (e.g. 4×4), and thereby while a size (area) of an integrated circuit that achieves the intra-prediction mode determination unit 200 is not increased, the bin number adjustment unit 260 causes a prediction mode candidate not contributing to block size expansion executed by the block expansion unit 370 difficult to select, whereby a probability of block size expansion executed by the block expansion unit 370 increases. As a result, the bin number of data after encoding can be reduced.

With regard to CU division and PU division, a bit stream includes a split_cu_flag, a cu_skip_flag, a pred_mode, a part_mode, an intra_chrome_pred_mode, and a rqt_root_cbf, and when the block expansion unit 370 has not executed block expansion, the bin number in a bit stream increase by the block expansion.

In the example embodiments, while the intra-prediction mode determination unit 200 is functionally divided as illustrated in FIG. 2, such a function assignment method is one example and therefore another function division may be performed. As one example, the intra-prediction mode determination unit 200 including the intra-prediction image generation unit 210, the prediction mode selection unit 250, and another block (one block that achieves functions of the residual calculation unit 220, the bin number determination unit 230, and the cost calculation unit 240) may be configured or the intra-prediction mode determination unit 200 including the prediction mode selection unit 250 and another block (one block that achieves functions of the intra-prediction image generation unit 210, the residual calculation unit 220, the bin number determination unit 230, and the cost calculation unit 240) may be configured.

While being achievable by an integrated circuit such as an FPGA and a programmable logic device (PLD), the intra-prediction mode determination unit 200 of the example embodiments can be also achieved by a computer program.

Figure 7:
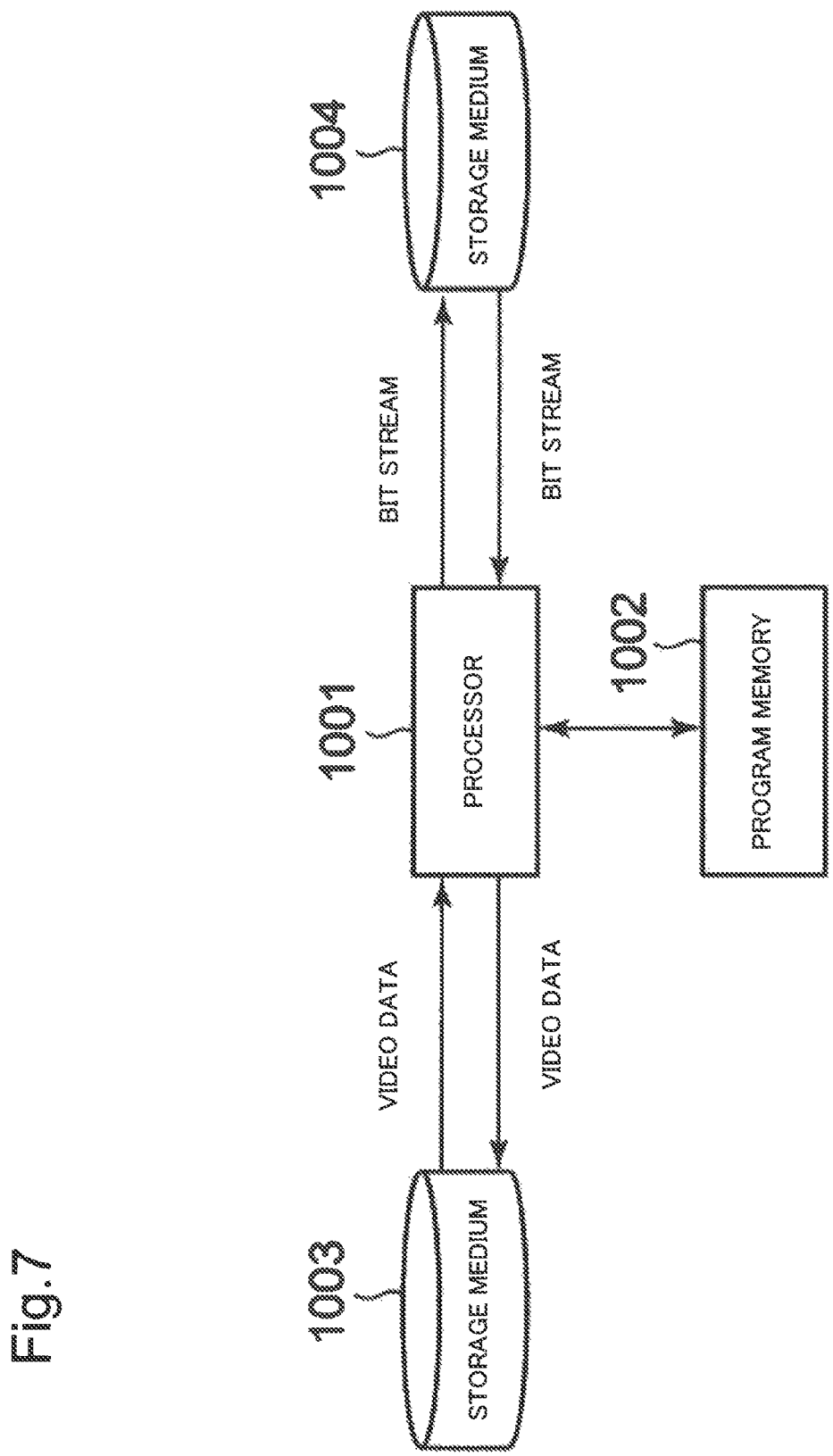
FIG. 7 is a block diagram illustrating a configuration example of an information processing system capable of achieving a function of an intra-prediction mode determination unit.

An information processing system illustrated in FIG. 7 includes a processor 1001, a program memory 1002, a storage medium 1003 for storing video data, and a storage medium 1004 for storing a bit stream and the like. The storage medium 1003 and the storage medium 1004 may be separate storage media or may be a storage area including the same storage medium. As a storage medium, a magnetic storage medium or a semiconductor storage medium such as a random access memory (RAM) is usable.

In the information processing system illustrated in FIG. 7, the program memory 1002 stores a program for achieving a function of each block illustrated in FIG. 2. The processor 1001 executes processing in accordance with a program stored on the program memory 1002 and thereby achieves a function of the intra-prediction determination unit 200 illustrated in FIG. 2.

A video encoding device including the intra-prediction mode determination unit 200 can be also achieved by an information processing system. In this case, the program memory 1002 stores a program for achieving a function of each block (except a buffer) illustrated in FIG. 1.

Figure 8:
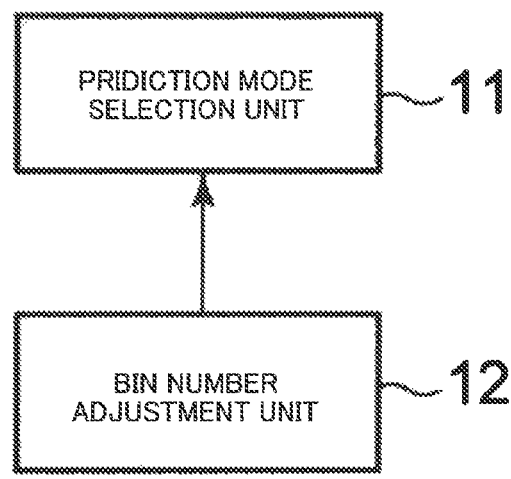
FIG. 8 is a block diagram illustrating main units of a prediction mode determination device.

FIG. 8 is a block diagram illustrating main units of a prediction mode determination device. The prediction mode determination device illustrated in FIG. 8 is applied to a device that recursively divides a block (e.g. a CTU) of an input video into small blocks and encodes the divided small blocks by intra-prediction or inter-frame prediction and includes: a prediction mode selection unit 11 (corresponding to the intra-prediction image generation unit 210, the residual calculation unit 220, the bin number determination unit 230, the cost calculation unit 240, and the prediction mode selection unit 250 in FIG. 2) that evaluates, with respect to each of the small blocks, an encoding cost of a plurality of prediction mode candidates, based on a residual in a prediction mode candidate and the bin number allocated to the prediction mode candidate and selects an intra-prediction mode from a plurality of prediction mode candidates, based on an evaluation result; and a bin number adjustment unit 12 (corresponding to the bin number adjustment unit 260 in FIG. 2) that increases the bin number associated with a specific prediction mode candidate when the prediction mode selection unit 11 evaluates an encoding cost. The prediction mode selection unit 11 and the bin number adjustment unit 12 are provided correspondingly to only one size (e.g. N×N) of sizes able to be taken by a small block.

Figure 9:
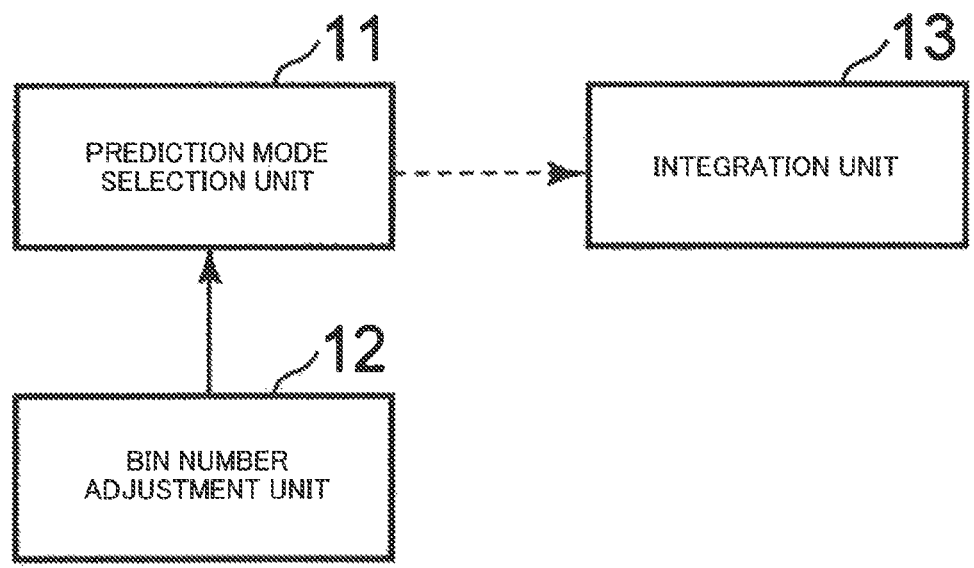
FIG. 9 is a block diagram illustrating main units of a prediction mode determination device and an integration unit that integrates a plurality of small blocks into one block.
Figure 10A:
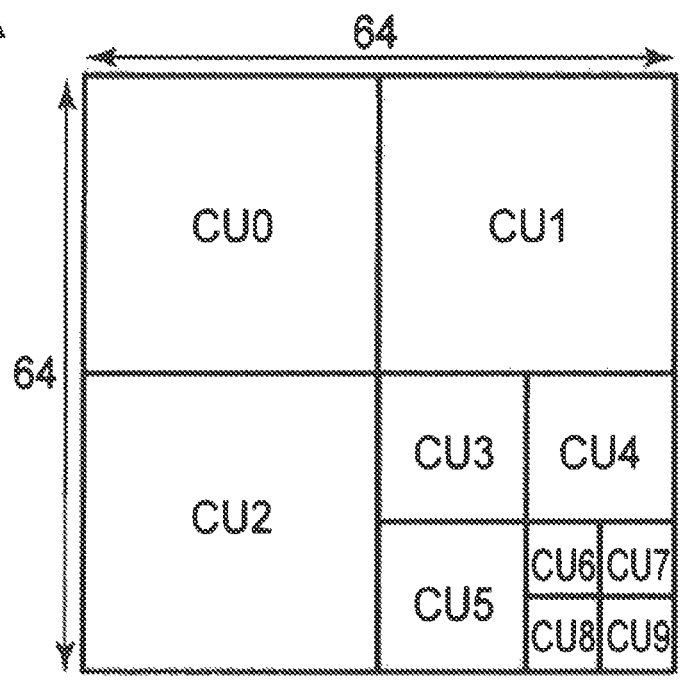
FIG. 10A is an illustrative diagram illustrating a CU division example of a CTU.
Figure 10B:
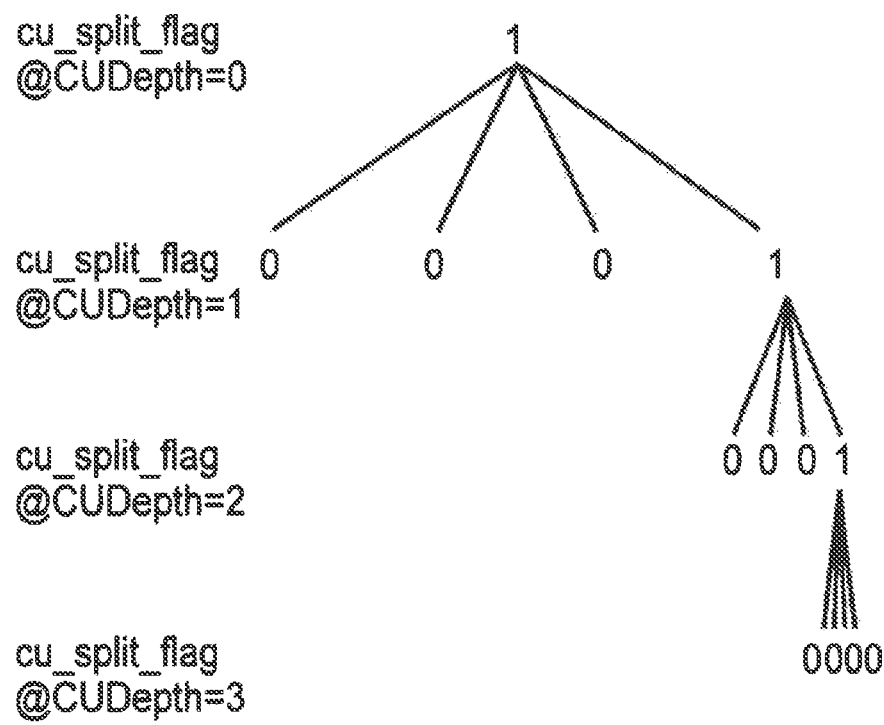
FIG. 10B is an illustrative diagram illustrating a quadtree structure corresponding to a CU division example of a CTU.
Figure 12:
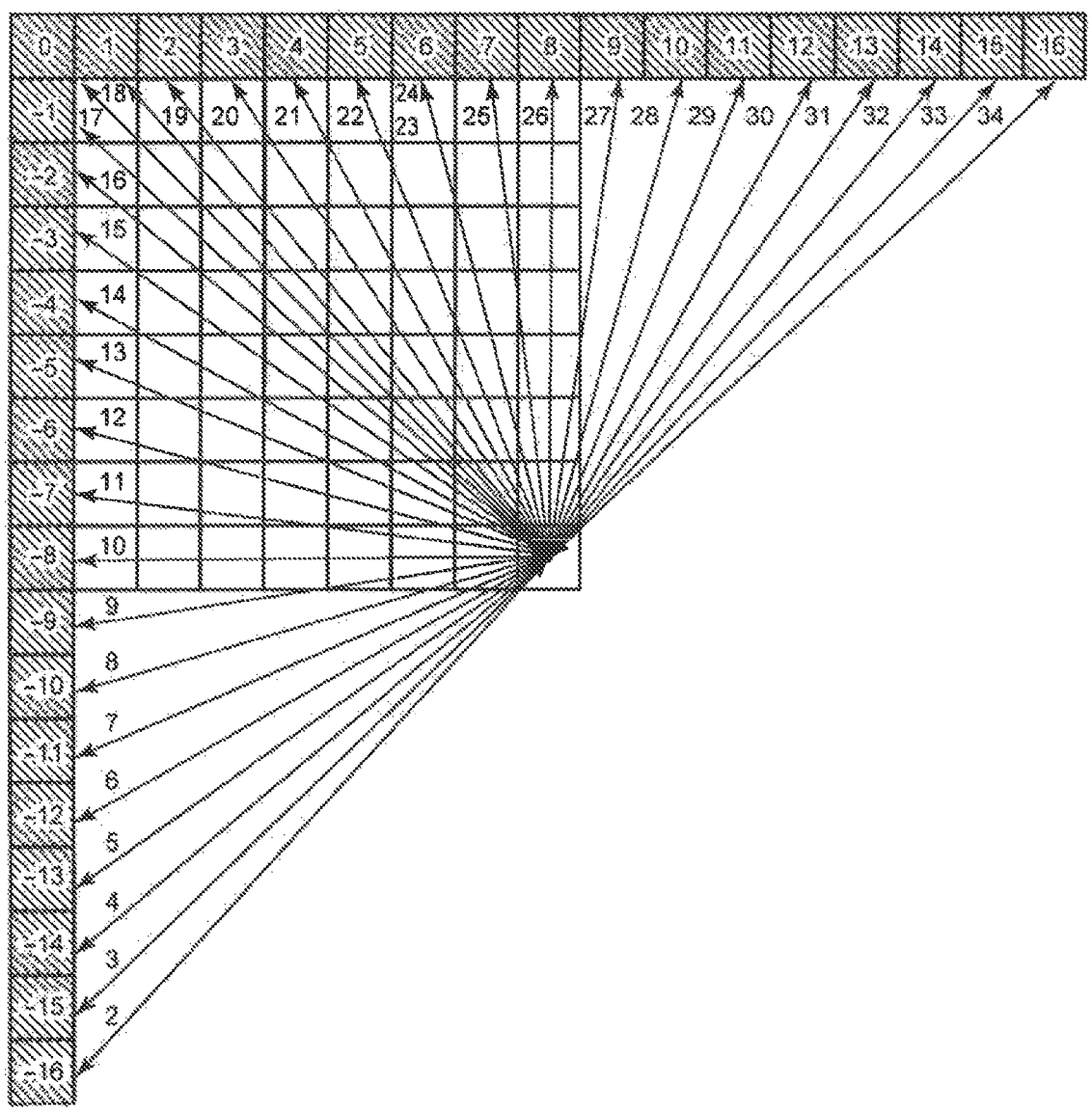
FIG. 12 is an illustrative diagram illustrating angle intra-prediction.

As illustrated in FIG. 9, a prediction mode determination device may be applied to a video encoding device including an integration unit 13 that integrates a plurality of small blocks into one block when a predetermined condition is satisfied, and the bin number adjustment unit 12 may be configured to increase the bin number in such a way as to increase a selection rate of an intra-prediction mode that causes a predetermined condition to be satisfied.

A part or the whole of the example embodiments can be described as the following supplementary notes but the constitution of the present invention is not limited to the following constitution.

(Supplementary Note 1)

An intra-prediction mode determination method applied to a video encoding device that recursively divides a block of an input video into small blocks and encodes the small blocks by intra-prediction or inter-frame prediction, the method including:

evaluating encoding costs of a plurality of prediction mode candidates, based on a residual in a prediction mode candidate and a bin number that is a count of bins allocated to the prediction mode candidate, for each of the small blocks in only one size of sizes able to be taken by the small blocks;

selecting, based on an evaluation result, an intra-prediction mode from the plurality of prediction mode candidates; and increasing a bin number for a specific prediction mode candidate when evaluating the encoding costs.

(Supplementary Note 2)

The intra-prediction mode determination method according to Supplementary Note 1, wherein the method is applied to the video encoding device including an integration function of integrating the small blocks into one block when a predetermined condition is satisfied, and the method further includes increasing a bin number in such a way as to increase a selection rate of an intra-prediction mode causing the predetermined condition to be satisfied.

(Supplementary Note 3)

The intra-prediction mode determination method according to Supplementary Note 1 or 2, further including:

allocating, to a prediction mode candidate different from a most probable mode (MPM), a bin number larger than that for the MPM; and increasing further the bin number for the prediction mode candidate different from the MPM.

(Supplementary Note 4)

The intra-prediction mode determination method according to Supplementary Note 1 or 2, further including:

increasing, when the small block that is an evaluation target is located on an upper side in one division shape, a bin number for a prediction mode candidate different from a prediction mode of an adjacent block on a left side of the small block; and increasing, when the small block that is an evaluation target is located on a lower side in one division shape, a bin number for a prediction mode candidate different from a prediction mode of an adjacent block on an upper side of the small block, (Supplementary Note 5)

The intra-prediction mode determination method according to Supplementary Note 3, further including increasing, when the small block that is an evaluation target is located in a lower left in one division shape, a bin number for a prediction mode candidate when the prediction mode candidate is an MPM and is different from a prediction mode of an adjacent block on an upper side of the small block.

(Supplementary Note 6)

The intra-prediction mode determination method according to Supplementary Note 3, further including treating, when the small block that is an evaluation target is located in a lower left in one division shape, a prediction mode of an adjacent block on an upper side as an MPM to which a smallest bin number is allocated.

(Supplementary Note 7)

An intra-prediction mode determination device applied to a video encoding device that recursively divides a block of an input video into small blocks and encodes the small blocks by intra-prediction or inter-frame prediction, the intra-prediction mode determination device including:

prediction mode selection means for evaluating encoding costs of a plurality of prediction mode candidates, based on a residual in a prediction mode candidate and a bin number that is a count of bins allocated to the prediction mode candidate, for each of the small blocks, and selecting, based on an evaluation result, an intra-prediction mode from the plurality of prediction mode candidates; and bin number adjustment means for increasing a bin number for a specific prediction mode candidate when the prediction mode selection means evaluates the encoding costs, wherein the prediction mode selection means and the bin number adjustment means are included for only one size of sizes able to be taken by the small blocks.

(Supplementary Note 8)

The intra-prediction mode determination device according to Supplementary Note 7, wherein the device is applied to the video encoding device including integration means for integrating the small blocks into one block when a predetermined condition is satisfied, and the bin number adjustment means increases a bin number in such a way as to increase a selection rate of an intra-prediction mode causing the predetermined condition to be satisfied.

(Supplementary Note 9)

The intra-prediction mode determination device according to Supplementary Note 7 or 8, wherein a bin number larger than that for a most probable mode (MPM) is allocated to a prediction mode candidate different from the MPM, and the bin number adjustment means increases further a bin number for the prediction mode candidate different from the MPM.

(Supplementary Note 10)

The intra-prediction mode determination device according to Supplementary Note 7 or 8, wherein the bin number adjustment means increases, when the small block that is an evaluation target is located on an upper side in one division shape, a bin number for a prediction mode candidate different from a prediction mode of an adjacent block on a left side of the small block, and increases, when the small block that is an evaluation target is located on a lower side in one division shape, a bin number for a prediction mode candidate different from a prediction mode of an adjacent block on an upper side of the small block.

(Supplementary Note 11)

The intra-prediction mode determination device according to Supplementary Note 9, wherein the bin number adjustment means increases, when the small block that is an evaluation target is located in a lower left in one division shape, a bin number for a prediction mode candidate when the prediction mode candidate is an MPM and is different from a prediction mode of an adjacent block on an upper side of the small block.

(Supplementary Note 12)

The intra-prediction mode determination device according to Supplementary Note 9, wherein the prediction mode selection means evaluates, when the small block that is an evaluation target is located in a lower left in one division shape, the encoding cost by regarding a prediction mode of an adjacent block on an upper side as an MPM to which a smallest bin number is allocated.

(Supplementary Note 13)

A storage medium storing an intra-prediction mode determination program that causes a computer implemented in a video encoding device that recursively divides a block of an input video into small blocks and encodes the small blocks by intra-prediction or inter-frame prediction, to execute:

processing of evaluating encoding costs of a plurality of prediction mode candidates, based on a residual in a prediction mode candidate and a bin number that is a count of bins allocated to the prediction mode candidate, for each of the small blocks in only one size of sizes able to be taken by the small block;

processing of selecting, based on an evaluation result, an intra-prediction mode from the plurality of prediction mode candidates; and processing of increasing a bin number for a specific prediction mode candidate when evaluating the encoding costs.

(Supplementary Note 14)

The storage medium according to Supplementary Note 13, wherein the medium stores the intra-prediction mode determination program that causes a computer implemented in a video encoding device including an integration function of integrating the small blocks into one block when a predetermined condition is satisfied, to execute processing of increasing a bin number in such a way as to increase a selection rate of an intra-prediction mode causing the predetermined condition to be satisfied.

(Supplementary Note 15)

The storage medium according to Supplementary Note 13 or 14, storing the intra-prediction mode determination program, wherein a bin number larger than that for a most probable mode (MPM) is allocated to a prediction mode candidate different from the MPM, and the program causes a computer to execute processing of increasing further a bin number for the prediction mode candidate different from the MPM.

(Supplementary Note 16)

The storage medium according to Supplementary Note 13 or 14, wherein the medium stores the intra-prediction mode determination program that causes a computer to execute processing of increasing, when the small block that is an evaluation target is located on an upper side in one division shape, a bin number for a prediction mode candidate different from a prediction mode of an adjacent block on a left side of the small block, and increasing, when the small block that is an evaluation target is located on a lower side in one division shape, a bin number for a prediction mode candidate different from a prediction mode of an adjacent block on an upper side of the small block.

(Supplementary Note 17)

The storage medium according to Supplementary Note 15, wherein the medium stores the intra-prediction mode determination program that causes a computer to execute processing of increasing, when the small block that is an evaluation target is located in a lower left in one division shape, a bin number for a prediction mode candidate when the prediction mode candidate is an MPM and is different from a prediction mode of an adjacent block on an upper side of the small block.

(Supplementary Note 18)

The storage medium according to Supplementary Note 15, wherein the medium stores the intra-prediction mode determination program that causes a computer to execute processing of evaluating, when the small block that is an evaluation target is located in a lower left in one division shape, the encoding cost by regarding a prediction mode of an adjacent block on an upper side as an MPM to which a smallest bin number is allocated.

While the present invention has been particularly shown and described with reference to example embodiments thereof, the present invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-177303, filed on Sep. 12, 2016, the disclosure of which is incorporated herein in its entirety by reference.

REFERENCE SIGNS LIST

11 Prediction mode selection unit
12 Bin number adjustment unit
13 Integration unit
110 Encoding parameter determination unit
120 Encoding unit
200 Intra-prediction mode determination unit
210 Intra-prediction image generation unit
220 Residual calculation unit
230 Bin number determination unit
240 Cost calculation unit
250 Prediction mode selection unit
260 Bin number adjustment unit
301 Transform unit
302 Quantization unit
303 Entropy encoding unit
304 Inverse-quantization/inverse-transform unit
305 Buffer
306 Prediction unit
307 Prediction mode/block size determination unit
350 Prediction mode determination unit
370 Block expansion unit
1001 Processor
1002 Program memory
1003 Storage medium
1004 Storage medium

What is claimed is:

1. An intra-prediction mode determination method applied to a video encoding device that recursively divides a block of an input video into small blocks and encodes the small blocks by intra-prediction or inter-frame prediction, the method comprising:

evaluating encoding costs of a plurality of prediction mode candidates, based on a residual in a prediction mode candidate and a bin number that is a count of bins allocated to the prediction mode candidate, for each of the small blocks in only one size of sizes able to be taken by the small blocks;

selecting, based on an evaluation result, an intra-prediction mode from the plurality of prediction mode candidates;

increasing a bin number for a specific prediction mode candidate when evaluating the encoding costs;

increasing, when the small block that is an evaluation target is located on an upper side in one division shape, a bin number for a prediction mode candidate different from a prediction mode of an adjacent block on a left side of the small block; and increasing, when the small block that is an evaluation target is located on a lower side in one division shape, a bin number for a prediction mode candidate different from a prediction mode of an adjacent block on an upper side of the small block.

2. The intra-prediction mode determination method according to claim 1, wherein the method is applied to the video encoding device including an integration function of integrating the small blocks into one block when a predetermined condition is satisfied, and the method further comprises increasing a bin number in such a way as to increase a selection rate of an intra-prediction mode causing the predetermined condition to be satisfied.

3. The intra-prediction mode determination method according to claim 1, further comprising:

allocating, to a prediction mode candidate different from a most probable mode (MPM), a bin number larger than that for the MPM; and increasing further the bin number for the prediction mode candidate different from the MPM.

4. The intra-prediction mode determination method according to claim 3, further comprising increasing, when the small block that is an evaluation target is located in a lower left in one division shape, a bin number for a prediction mode candidate when the prediction mode candidate is an MPM and is different from a prediction mode of an adjacent block on an upper side of the small block.

5. The intra-prediction mode determination method according to claim 3, further comprising treating, when the small block that is an evaluation target is located in a lower left in one division shape, a prediction mode of an adjacent block on an upper side as an MPM to which a smallest bin number is allocated.

6. An intra-prediction mode determination device applied to a video encoding device that recursively divides a block of an input video into small blocks and encodes the small blocks by intra-prediction or inter-frame prediction, the intra-prediction mode determination device comprising:

at least one memory that stores a set of instructions; and at least one processor configured to execute the set of instructions to:

evaluate encoding costs of a plurality of prediction mode candidates, based on a residual in a prediction mode candidate and a bin number that is a count of bins allocated to the prediction mode candidate, for each of the small blocks in only one size of sizes able to be taken by the small blocks;

select, based on an evaluation result, an intra-prediction mode from the plurality of prediction mode candidates;

increase a bin number for a specific prediction mode candidate when evaluating the encoding costs;

increase, when the small block that is an evaluation target is located on an upper side in one division shape, a bin number for a prediction mode candidate different from a prediction mode of an adjacent block on a left side of the small block; and increase, when the small block that is an evaluation target is located on a lower side in one division shape, a bin number for a prediction mode candidate different from a prediction mode of an adjacent block on an upper side of the small block.

7. The intra-prediction mode determination device according to claim 6, wherein the device is applied to the video encoding device configured to integrate the small blocks into one block when a predetermined condition is satisfied, and the at least one processor is further configured to increase a bin number in such a way as to increase a selection rate of an intra-prediction mode causing the predetermined condition to be satisfied.

8. The intra-prediction mode determination device according claim 6, wherein a bin number larger than that for a most probable mode (MPM) is allocated to a prediction mode candidate different from the MPM, and the at least one processor is further configured to increase further a bin number for the prediction mode candidate different from the MPM.

9. The intra-prediction mode determination device according to claim 8, wherein the at least one processor is further configured to increase, when the small block that is an evaluation target is located in a lower left in one division shape, a bin number for a prediction mode candidate when the prediction mode candidate is an MPM and is different from a prediction mode of an adjacent block on an upper side of the small block.

10. The intra-prediction mode determination device according to claim 8, wherein the at least one processor is further configured to evaluate, when the small block that is an evaluation target is located in a lower left in one division shape, the encoding cost by regarding a prediction mode of an adjacent block on an upper side as an MPM to which a smallest bin number is allocated.

11. A non-transitory computer-readable storage medium storing an intra-prediction mode determination program that causes a computer implemented in a video encoding device that recursively divides a block of an input video into small blocks and encodes the small blocks by intra-prediction or inter-frame prediction, to execute:

processing of evaluating encoding costs of a plurality of prediction mode candidates, based on a residual in a prediction mode candidate and a bin number that is a count of bins allocated to the prediction mode candidate, for each of the small blocks in only one size of sizes able to be taken by the small block;

processing of selecting, based on an evaluation result, an intra-prediction mode from the plurality of prediction mode candidates;

processing of increasing a bin number for a specific prediction mode candidate when evaluating the encoding costs; and processing of increasing, when the small block that is an evaluation target is located on an upper side in one division shape, a bin number for a prediction mode candidate different from a prediction mode of an adjacent block on a left side of the small block, and increasing, when the small block that is an evaluation target is located on a lower side in one division shape, a bin number for a prediction mode candidate different from a prediction mode of an adjacent block on an upper side of the small block.

12. The storage medium according to claim 11, wherein the medium stores the intra-prediction mode determination program that causes a computer implemented in a video encoding device including an integration function of integrating the small blocks into one block when a predetermined condition is satisfied, to execute processing of increasing a bin number in such a way as to increase a selection rate of an intra-prediction mode causing the predetermined condition to be satisfied.

13. The storage medium according to claim 11, storing the intra-prediction mode determination program, wherein a bin number larger than that for a most probable mode (MPM) is allocated to a prediction mode candidate different from the MPM, and the program causes a computer to execute processing of increasing further a bin number for the prediction mode candidate different from the MPM.

14. The storage medium according to claim 13, wherein the medium stores the intra-prediction mode determination program that causes a computer to execute processing of increasing, when the small block that is an evaluation target is located in a lower left in one division shape, a bin number for a prediction mode candidate when the prediction mode candidate is an MPM and is different from a prediction mode of an adjacent block on an upper side of the small block.

15. The storage medium according to claim 13, wherein the medium stores the intra-prediction mode determination program that causes a computer to execute processing of evaluating, when the small block that is an evaluation target is located in a lower left in one division shape, the encoding cost by regarding a prediction mode of an adjacent block on an upper side as an MPM to which a smallest bin number is allocated.

* * * * *